T. W. Clarke.
Washing Blankets of Print'g Mach.

Nº 48053. Patented Jun. 6, 1865.

Witnesses.

Inventor:
T. W. Clarke

UNITED STATES PATENT OFFICE.

THOMAS W. CLARKE, OF MANCHESTER, NEW HAMPSHIRE.

IMPROVEMENT IN WASHING THE BLANKETS OF PRINTING-MACHINES.

Specification forming part of Letters Patent No. 48,053, dated June 6, 1865.

*To all whom it may concern:*

Be it known that I, THOS. W. CLARKE, of Manchester, in the county of Hillsborough and State of New Hampshire, have invented a new and Improved Device for Washing the Blankets of Printing-Machines; and I do hereby declare that the following is a full, clear, and exact description thereof, which will enable those skilled in the art to make and use the same, reference being had to the accompanying drawings, forming part of this specification, in which—

Figure 1:
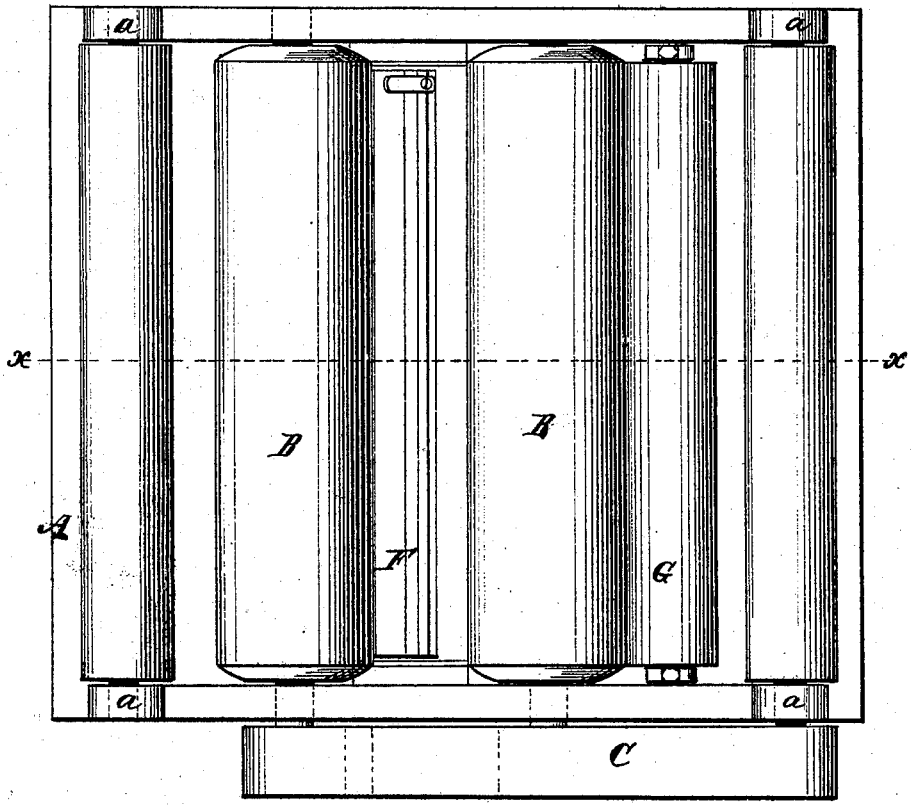
Figure 2:
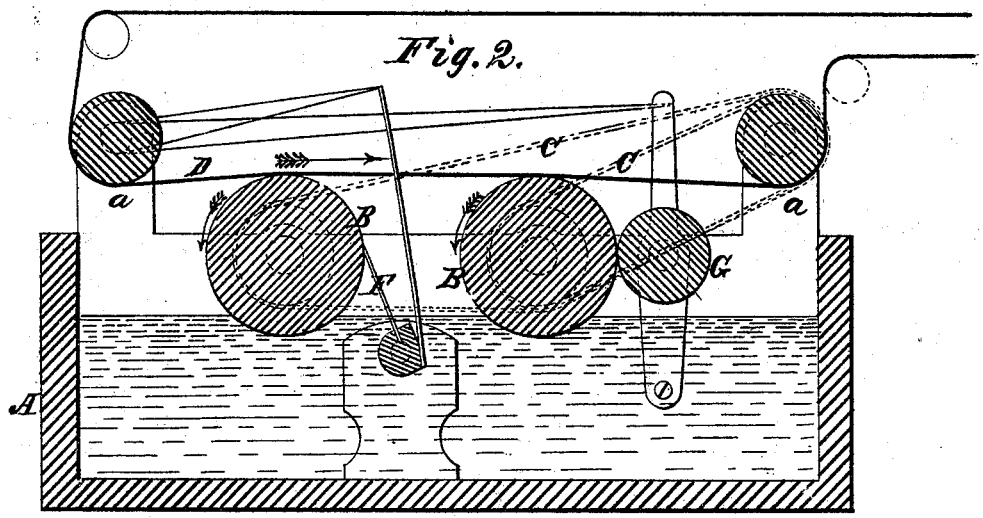

Figure 1 is a plan or top view of my invention; Fig. 2, a side sectional view of the same, taken in the line $x\ x$, Fig. 1.

Similar letters of reference indicate corresponding parts.

This invention relates to a new and useful improvement in means employed for washing the blankets of machines for printing fabrics, such as calicoes, delaines, &c. Hitherto the blankets have been washed by means of rollers placed in a box or tank containing water, and the blanket arranged so as to work in contact with and pass over said rollers, the blanket then passing between pressure or squeeze rollers in order to have the moisture taken from it before it passes around the cylinder of the printing-machine. This plan is defective. In the first place, the pressure or squeeze rollers wear the blanket, and, in the second place, the washing-rollers, in consequence of being well charged with moisture, bring an excess of the latter in contact with the blanket, and, in case the latter is perforated or has a hole made in it by wear or accident, causes the cloth to which the rubber portion of the blanket is attached or cemented to be separated from the cloth, thereby spoiling the blanket.

My improvement consists in dispensing with the pressure or squeeze rollers entirely and using in connection with the washing-rollers a "doctor" or scraper or a pressure-roller, so as to take the superfluous moisture from the washing-rollers, leaving the latter only possessed of sufficient moisture to wash the color from the blanket.

A represents a tank or box containing water, and having two parallel rollers, B B, in its upper part, which are rotated by belts C in the direction as indicated by the arrows upon them.

D represents the blanket, which passes around rollers E E, fitted between uprights $a$ at the ends of the tank or box, and also around the cylinder of the printing-machine, the rollers E E having such a relative position with the rollers B B that the blanket will pass over the upper edges of the rollers B B, as shown in Fig. 2. The lower parts of the rollers B are immersed in the water in the tank, and receive moisture to wash the blanket D as it passes over them. The excess of moisture is taken from the rollers either by a scraper, F, technically termed a "doctor," or a pressure-roller, G, may be employed. Either will answer. (See Fig. 2.) By thus taking the excess of moisture from the rollers B B the blanket D will not be surcharged with water, the rollers B merely taking up enough to wipe or wash off the color which the blanket receives in passing around the cylinder of the printing-machine. Thus I avoid the pressure or squeeze rollers, which injure the blanket, and in case the latter becomes casually perforated at any part no moisture will pass through to cause a separation of the rubber portion of the blanket from the cloth.

Having thus described my invention, I claim as new and desire to secure by Letters Patent—

The employment or use in the blanket-washing devices of machines for printing fabrics—such as calicoes, delaines, &c.—of a scraper or pressure-roller to the washing-rollers, to operate in the manner substantially as and for the purpose set forth.

THOMAS W. CLARKE.

Witnesses:
 HENRY WHITTAKER,
 LEWIS W. CLARK.